(12) United States Patent
Shimmura

(10) Patent No.: US 8,032,786 B2
(45) Date of Patent: Oct. 4, 2011

(54) INFORMATION-PROCESSING EQUIPMENT AND SYSTEM THEREFOR WITH SWITCHING CONTROL FOR SWITCHOVER OPERATION

(75) Inventor: Yukihiro Shimmura, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 445 days.

(21) Appl. No.: 12/109,014

(22) Filed: Apr. 24, 2008

(65) Prior Publication Data

US 2008/0307254 A1    Dec. 11, 2008

(30) Foreign Application Priority Data

Jun. 6, 2007   (JP) .................................. 2007-150384

(51) Int. Cl.
*G06F 11/00* (2006.01)
(52) U.S. Cl. ........................ 714/13; 714/4.11
(58) Field of Classification Search ................ 714/4, 13, 714/38, 38.1, 12
See application file for complete search history.

(56) References Cited

U.S. PATENT DOCUMENTS

| | | | | |
|---|---|---|---|---|
| 6,038,379 | A * | 3/2000 | Fletcher et al. ............... | 709/230 |
| 6,718,383 | B1 * | 4/2004 | Hebert ........................... | 709/224 |
| 7,228,453 | B2 * | 6/2007 | O'Brien et al. ................. | 714/13 |
| 7,496,783 | B1 * | 2/2009 | Graf et al. ...................... | 714/4 |
| 7,613,749 | B2 * | 11/2009 | Flynn et al. .................... | 1/1 |
| 2003/0126315 | A1 * | 7/2003 | Tan et al. ....................... | 710/1 |
| 2003/0158933 | A1 * | 8/2003 | Smith ............................. | 709/224 |
| 2004/0205755 | A1 * | 10/2004 | Lescouet et al. ............... | 718/100 |
| 2006/0085792 | A1 * | 4/2006 | Traut ............................. | 718/100 |
| 2006/0090097 | A1 * | 4/2006 | Ngan et al. ..................... | 714/6 |
| 2006/0155912 | A1 * | 7/2006 | Singh et al. .................... | 711/6 |
| 2006/0206611 | A1 | 9/2006 | Nakamura | |
| 2006/0271813 | A1 * | 11/2006 | Horton et al. .................. | 714/4 |
| 2006/0282519 | A1 * | 12/2006 | Trevathan et al. ............. | 709/223 |
| 2007/0198710 | A1 * | 8/2007 | Gopalakrishnan ............. | 709/225 |
| 2007/0220323 | A1 * | 9/2007 | Nagata ........................... | 714/13 |
| 2008/0307254 | A1 * | 12/2008 | Shimmura ...................... | 714/10 |

FOREIGN PATENT DOCUMENTS

| | | |
|---|---|---|
| JP | 8-95932 A | 4/1996 |
| JP | 11-149385 | 6/1999 |
| JP | 2005-173751 | 6/2005 |
| JP | 2005-250641 A | 9/2005 |
| JP | 2006-253900 A | 9/2006 |

* cited by examiner

*Primary Examiner* — Philip Guyton

(74) *Attorney, Agent, or Firm* — Mattingly & Malur, P.C.

(57) ABSTRACT

In cases where the system which performs service provision includes plural kinds of OS, the plural kinds of OS are operated simultaneously on one standby server provided with the virtual control unit. When a failure etc. occurred in the operation system server necessitates the system switchover from the operation system server to the standby server, the virtual control unit of the standby server distinguishes an operation system server in which the failure has occurred, and takes over the processing to the switching control unit on a suitable OS on the standby server.

6 Claims, 7 Drawing Sheets

FIG. 5

OPERATION SYSTEM SERVER 30-A
SWITCHING CONTROL UNIT 33-1

COMMON STANDBY SYSTEM SERVER 400
VIRTUAL CONTROL UNIT 410 | SWITCHING CONTROL UNIT 33-3

- OPERATION STATE
- DETECTION OF SYSTEM SWITCHOVER — S85
- APPLICATION SERVICE HALT PROCESSING — S87
- DELETION OF SERVICE IP ADDRESS — S89
- STANDBY STATE

STANDBY STATE

NOTICE OF SYSTEM SWITCHOVER — S93

- DETERMINATION OF CORRESPONDING — S95
- MAIN OS SWITCHOVER — S97

NOTICE OF SYSTEM SWITCHOVER — S99

- S101 ASSIGNMENT OF SERVER IP ADDRESS
- S103 APPLICATION SERVICE START PROCESSING
- OPERATION STATE

NOTICE OF START OF OPERATION — S107

NOTICE OF START OF OPERATION — S109

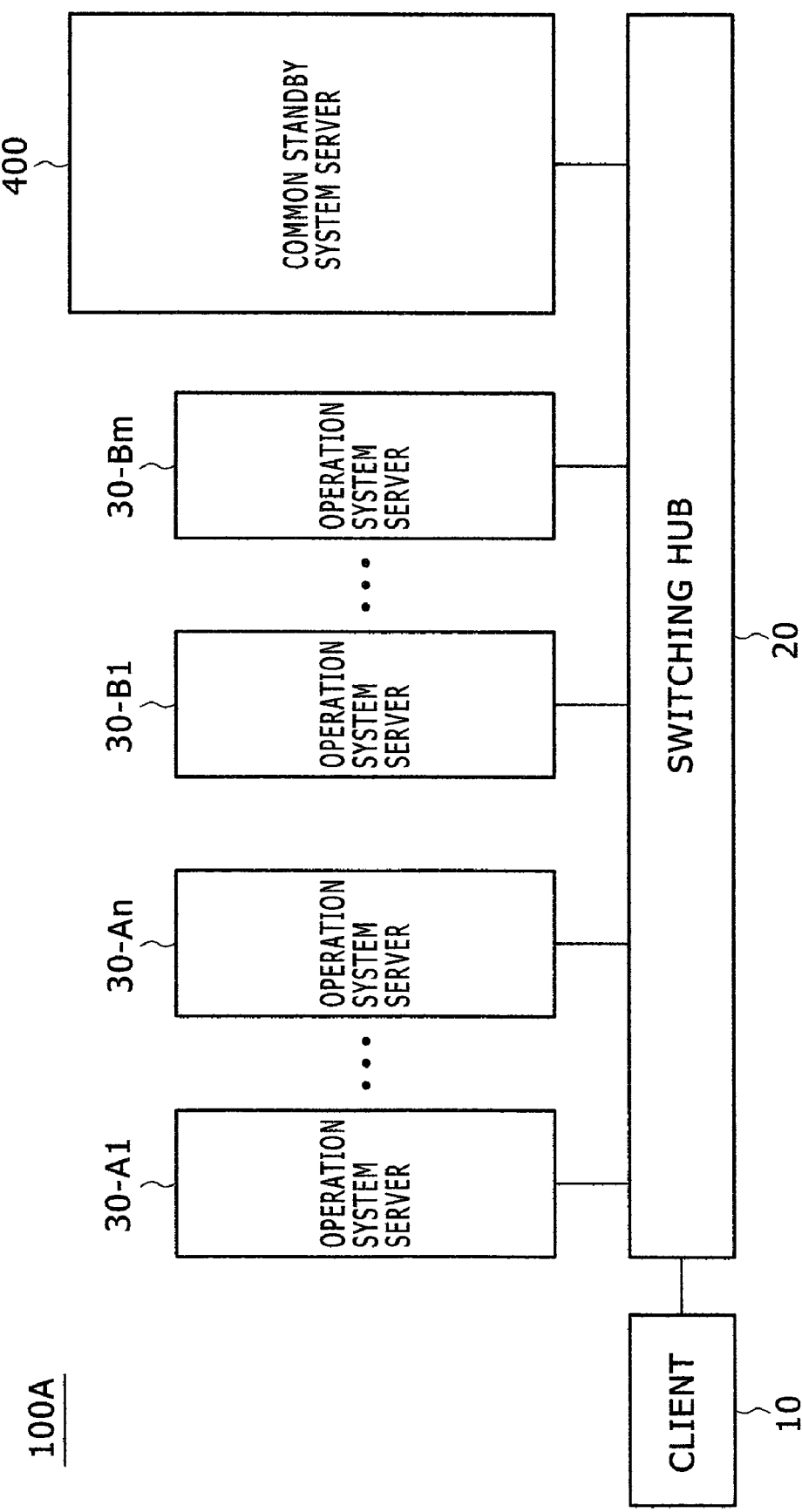

INFORMATION-PROCESSING EQUIPMENT AND SYSTEM THEREFOR WITH SWITCHING CONTROL FOR SWITCHOVER OPERATION

CLAIM OF PRIORITY

The present application claims priority from Japanese patent application serial no. 2007-150384, filed on Jun. 6, 2007, the content of which is hereby incorporated by reference into this application.

BACKGROUND OF THE INVENTION

The present invention relates to information-processing equipment and an information-processing system, especially to the information-processing equipment and the information-processing system which can be switched over redundantly.

A general-purpose server is widely used for the service provision in an IP network. Especially in the service which is not allowed to halt, a service provision server is operated with redundancy in order to secure reliability. In a redundant operation, when the service provision server has a breakdown and falls in the state in which a further service provision is difficult to continue, the service provision is continued by switching over to a standby server which is prepared separately.

There is a virtualization technology as technology of operating plural operating systems (OSs) on one general-purpose server. Although there are various realization methods in virtualization of hardware, the invention described by Japanese Patent Application Laid-Open Publication NO. H11-149385 discloses a multi-OS configuration method in which plural OSs are executed simultaneously on one computer, by realization of the divided management of hardware resources and suitable interruption processing.

The invention described by Japanese Patent Application Laid-Open Publication NO. 2005-173751 discloses how to realize stable system operating management by performing a periodical switching processing between a master system and a standby system, with application of virtual machine system technology of a computer system installed in plural bases coupled via a network.

Conventionally, the service provision in an IP network is performed by the plural-OS-coexisting system from various reasons such as the versatility of a service content, maintenance and operation, etc., and the redundant configuration in such a system needed to be constructed for every OS. That is, when a general-purpose server using a certain OS (A) and another general-purpose server using a certain OS (B) provide respectively different services, a spare server (hereinafter called a standby server) to each of the general-purpose servers for OS (A) and OS (B) is needed. In this case, although not providing service, the standby server must be always operative in order to accept system switchover from the operation system server in shortest possible time when a failure occurs in the operation system server which is providing the service. It is indispensable to shorten the system switchover time as much as possible in recent days when voice communication has been performed in a network.

However, when service provision is carried out using the system in which plural kinds of OS are coexisting as mentioned above, many standby servers must coexist, leading to the waste of resources. Such as standby power expenses and personnel expenses for operating the standby servers will also push up extra costs.

Japanese Patent Application Laid-Open Publication NO. H11-149385 and Japanese Patent Application Laid-Open Publication NO. 2005-173751 have failed in describing about these problems.

SUMMARY OF THE INVENTION

The problems mentioned above can be solved by an information-processing system which includes: first information-processing equipment operable to execute a first operating system and a first application to run on the first operating system; second information-processing equipment operable to execute a second operating system and a second application to run on the second operating system; and third information-processing equipment including a switching control unit and operable to execute the first operating system, the first application, the second operating system, and the second application. In the information-processing system, when the first information-processing equipment accepts operation to the first application of own equipment, the first information-processing equipment reflects the operation to the first application of the third information-processing equipment, and when the second information-processing equipment accepts operation to the second application of own equipment, the second information-processing equipment reflects the operation to the second application of the third information-processing equipment, and when a notice of system switchover is received, the switching control unit specifies a service IP address of an operating system and an application of a switchover destination from a source IP address, sets the service IP address to own equipment, and starts to provide service of the specified application.

The problems mentioned above can be also solved by an information-processing equipment which includes a switching control unit and operable to execute a first operating system, a first application to run on the first operating system, a second operating system, and a second application to run on the second operating system. In the information-processing equipment, when a notice of system switchover is received, the switching control unit specifies a service IP address of an operating system and an application of a switchover destination from a source IP address, sets the service IP address to own equipment, and starts to provide service of the specified application.

BRIEF DESCRIPTION OF THE DRAWINGS

Preferred embodiments of the present invention will now be described in conjunction with the accompanying drawings, in which;

FIG. 5 is a sequence diagram of the switchover between the operation system server and the common standby system server (for a different main OS);

FIG. 7 is a block diagram of another server client system.

DESCRIPTION OF THE PREFERRED EMBODIMENTS

Figure 1:
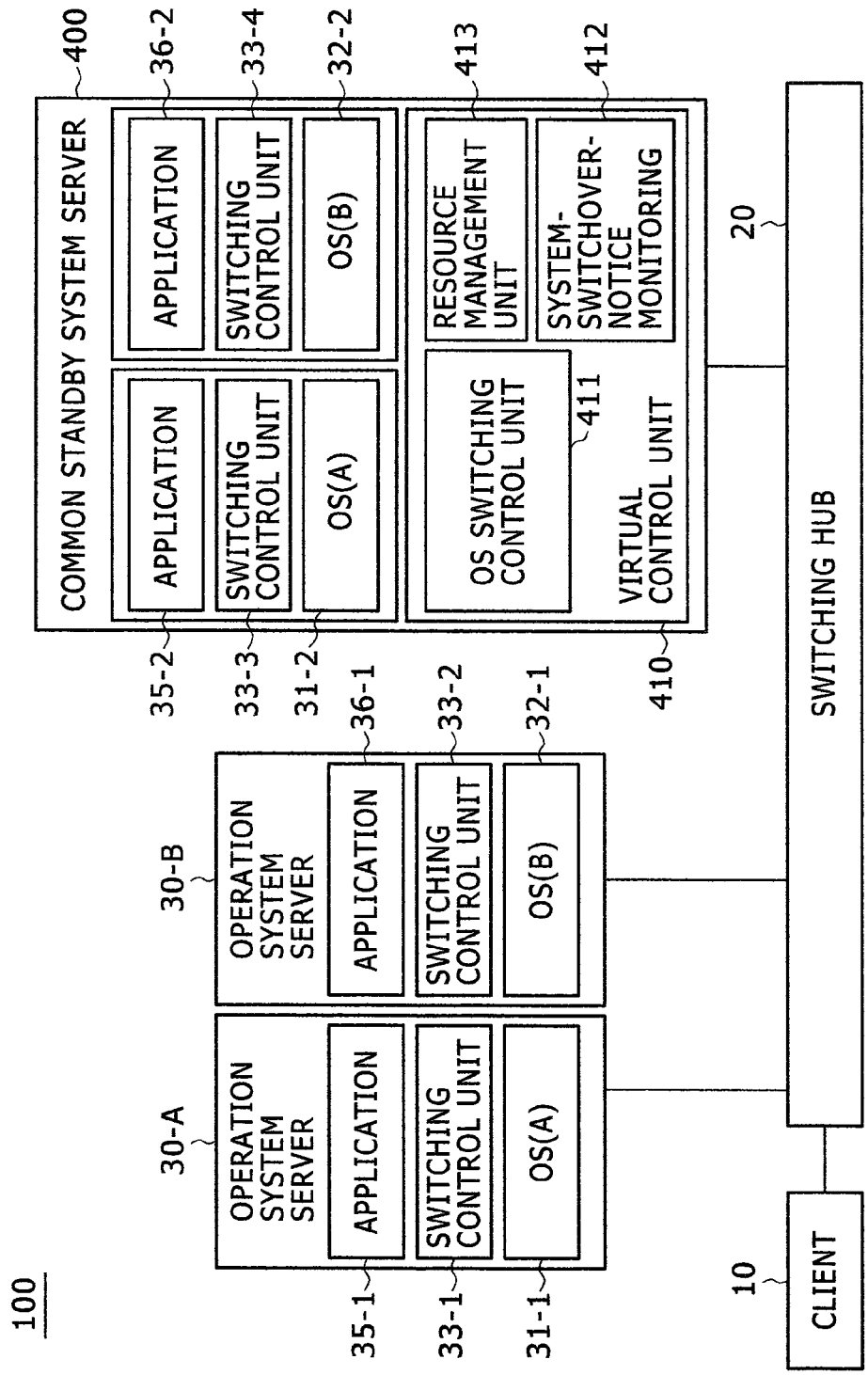
FIG. 1 is a block diagram of a server client system.
Figure 2:
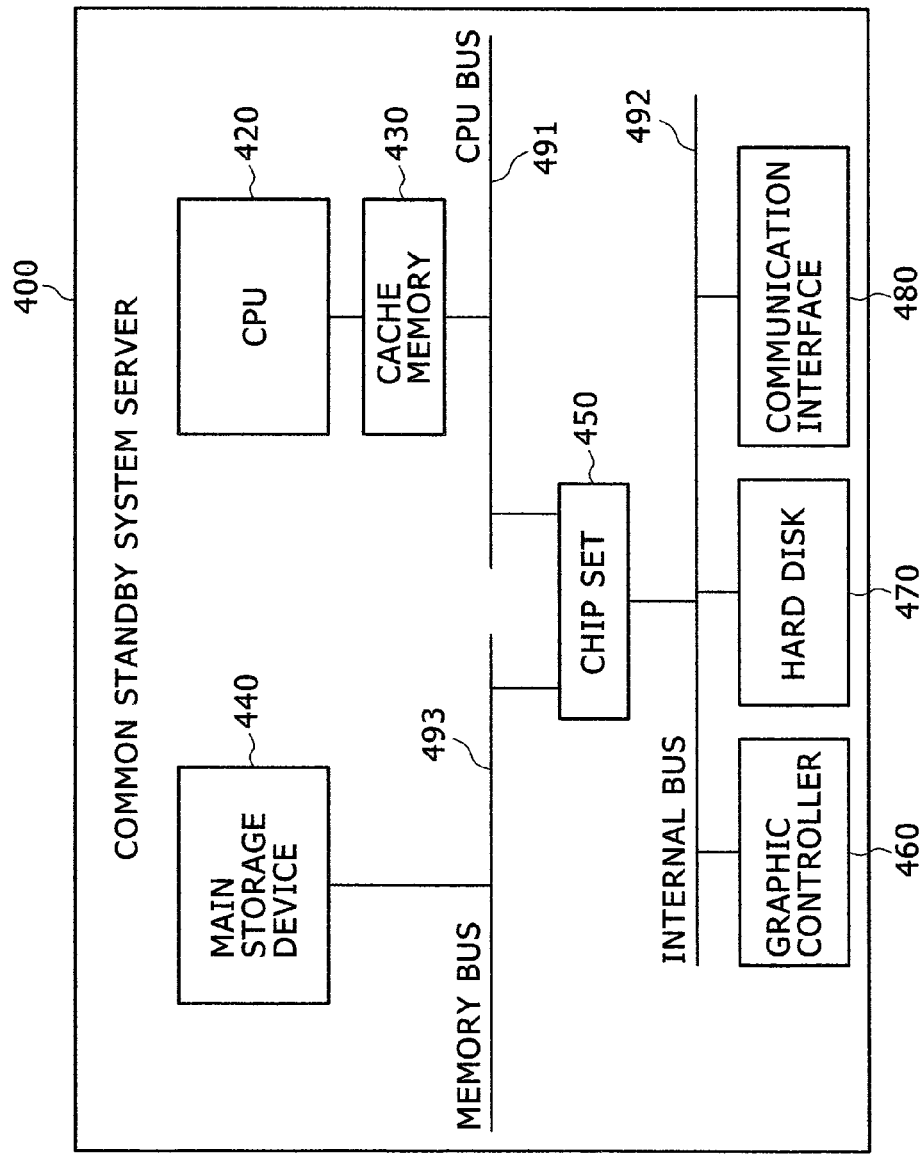
FIG. 2 is a hardware block diagram of a common standby system.
Figure 3:
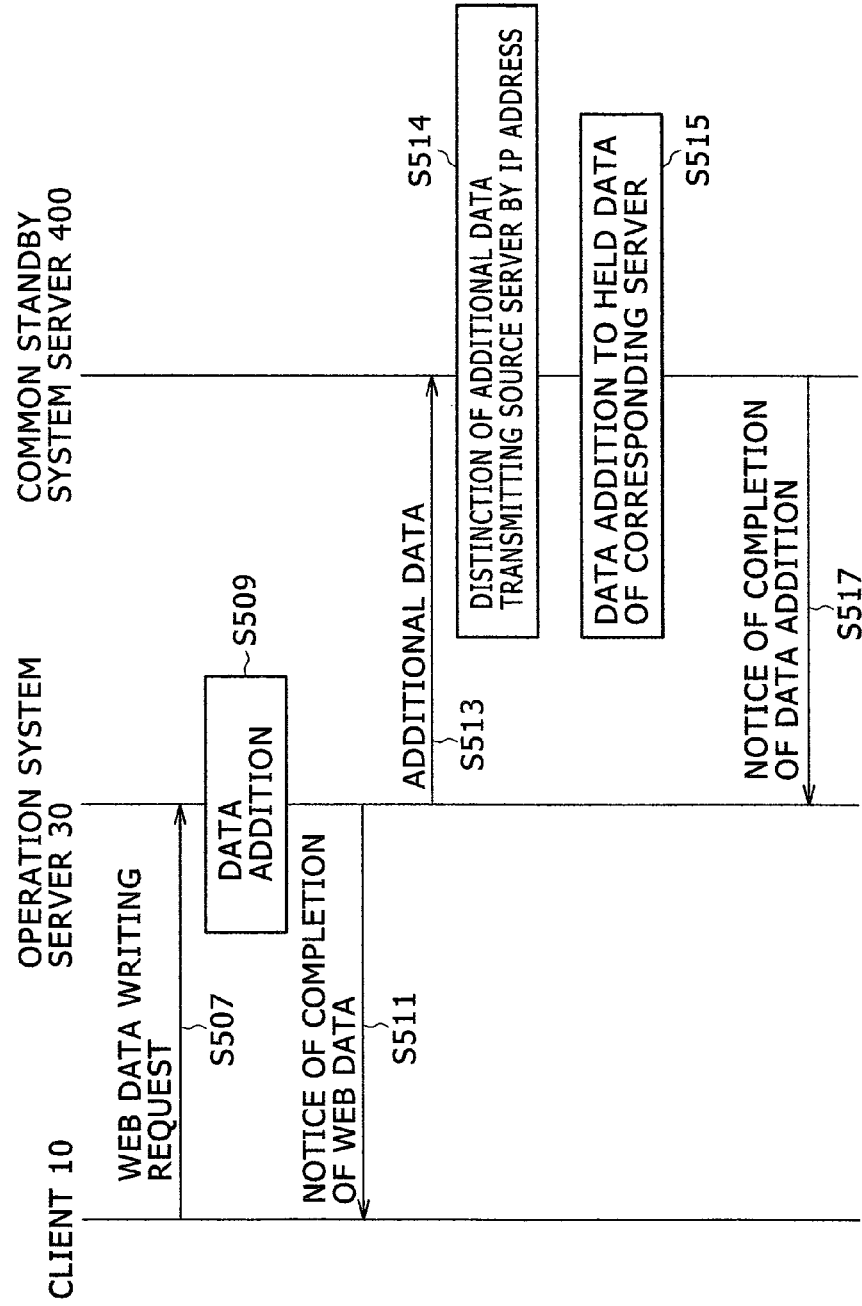
FIG. 3 is a sequence diagram of ordinary processing among a client, an operation system server, and a common standby system server.
Figure 4:
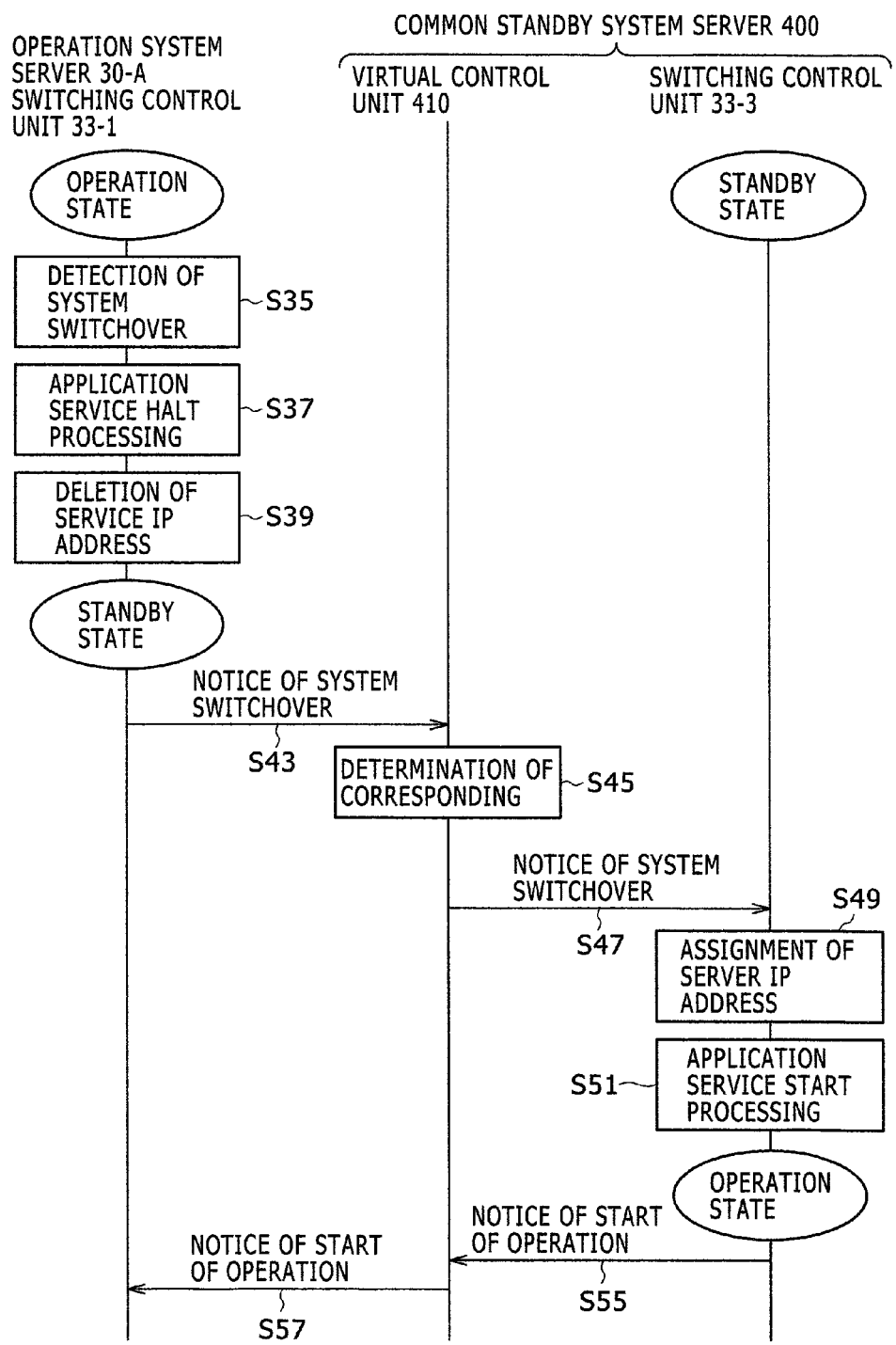
FIG. 4 is a sequence diagram of the switchover between the operation system server and the common standby system server (for the same main OS)
Figure 6:
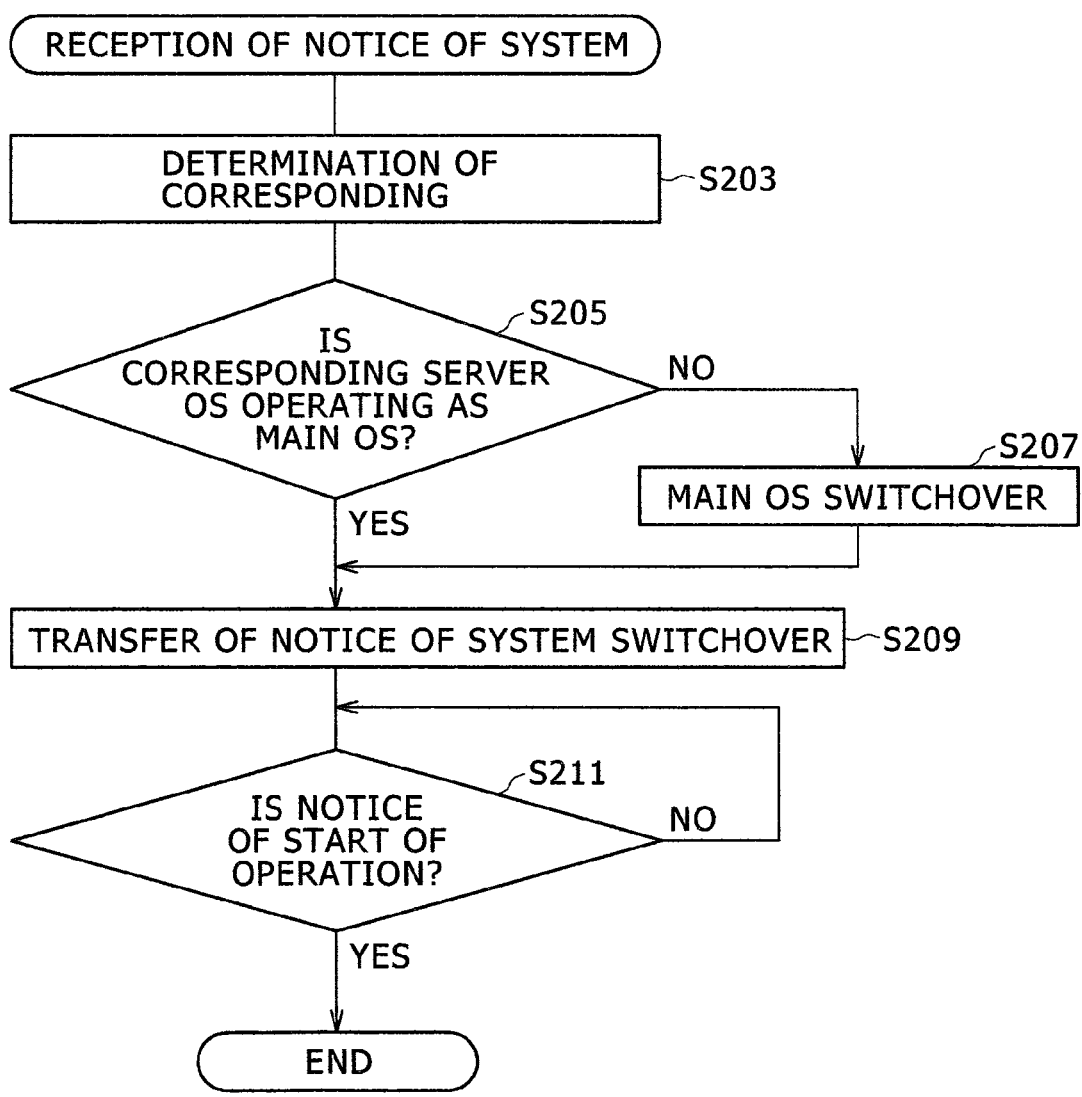
FIG. 6 is a flow chart illustrating switching processing of the common standby system server.

Hereinafter, embodiments will be explained, using examples with reference to the accompanying drawings. In the following description, the same reference number will be given to a substantially same element, and the duplicated explanation thereof will be omitted. Herein, FIG. 1 is a block diagram of a server client system; FIG. 2 is a hardware block diagram of a common standby system; FIG. 3 is a sequence diagram of ordinary processing among a client, an operation system server, and a common standby system server; FIG. 4 is a sequence diagram of the switchover between the operation system server and the common standby system server (for the same main OS); FIG. 5 is a sequence diagram of the switchover between the operation system server and the common standby system server (for a different main OS); FIG. 6 is a flow chart illustrating switching processing of the common standby system server; and FIG. 7 is a block diagram of another server client system.

In FIG. 1, the server client system 100 includes two sets of operation system servers (information-processing equipment in the operation system) 30, a common standby system server (information-processing equipment in the common standby system) 400, and a client's computer (hereinafter called a client) 10, all coupled to a switching hub 20.

An operation system server 30-A which performs service provision using a certain OS (A) 31-1 and another operation system server 30-B which performs service provision using another OS (B) 32-1 include, respectively, OS 31 or 32, a switching control unit 33 which performs switching control in the case of system switchover, and application 35 or 36 which operate on OS 31 or 32.

A common standby system server 400 operates as a standby server of the operation system servers 30, and includes a virtual control unit 410 which controls the simultaneous operation of plural kinds of OS on one general-purpose server, OSs 31 and 32 respectively corresponding to the operation system server 30, a switching control unit 33, and applications 35 and 36.

The virtual control unit 410 includes a system-switchover-notice monitoring unit 412 for receiving a notice of system switchover from the operation system server 30, an OS switching control unit 411 for controlling plural OSs 31 and 32 which simultaneously operate on the virtual control unit 410, and a resource management unit 413 for managing assignment of the resource to each of OSs 31 and 32.

The operation system server 30-A, the operation system server 30-B, and the common standby system server 400 are coupled to the switching hub 20 and provide service to a client 10 through a network (not shown).

The common standby system server 400 performs the simultaneous operation of OS (A) 31-2 and OS (B) 32-2 at the time of system operation. On this occasion, according to the priority information of operation OS specified at the time of a system startup, the resource management unit 413 assigns hardware resources, such as a memory and a CPU activity ratio. OS with a high priority is called main OS. OS corresponding to the operation system server 30 which is desired to secure higher reliability is assigned as the main OS. By this scheme, the preliminary processing such as the data-passing before system switchover, and the actual system switchover processing are executed using sufficient hardware resource.

With reference to FIG. 2, the hardware configuration of the common standby system server 400 is explained. In FIG. 2, the common standby system server 400 includes CPU 420, a cache memory 430, a main storage device (main memory) 440, a chip set 450 which couples CPU 420 and the main storage device 440 to peripheral devices, a graphic controller 460, a hard disk 470, a communication interface 480, a CPU bus 491 which couples CPU 420 and the chip set 450 via the cache memory 430, a memory bus 493 which couples the chip set 450 with the main storage device 440, and an internal bus 492 which couples the chip set 450, the graphic controller 460, the hard disk 470, and the communication interface 480. The function of the common standby system server 400 explained in FIG. 1 is realized when CPU 420 executes the program stored in the main storage device 440.

With reference to Table 1, the operation-system-server management table possessed by the OS switching control unit 411 of the common standby system server 400 is explained. In Table 1, the operation-system-server management table includes IP address of an operation system server, a server number, OS, an application, and a service IP address. Herein, the IP address is used for communication with the common standby system server 400 of the operation system server 30. The server number identifies the operation system server 30. The OS indicates OS under operation in the operation system server 30. The application indicates an application under operation in the operation system server 30. The service address is shown to the client 10 by the operation system server 30 and the common standby system server 400.

The OS switching control unit 411, upon receiving a notice of switchover, refers to the operation-system-server management table, and can determine a transmitting source server, OS and application under operation in the transmitting source server, and a service address, from the IP address of the transmitting source.

TABLE 1

Operation-system-server management table

| Address | Server # | OS | Application | Service IP address |
| --- | --- | --- | --- | --- |
| 192.168.x.x | 1 | A | WEB | 210.235.x.x |
| 192.168.x.y | 2 | B | SIP | 210.235.x.y |

With reference to FIG. 3, the sequence among the client, the operation system server, and the common standby system server is explained, when there is no failure in the operation system server 30. Herein, the sequence is explained on the assumption that the operation system server is a WEB server.

In FIG. 3, the client 10 transmits a request of WEB data writing, to the operation system server 30 (S507). The operation system server 30, upon receiving the request of WEB data writing, adds data (S509), and transmits a notice of completion of WEB data writing, to the client 10 (S511). Furthermore, the operation system server 30 transmits the additional data to the common standby system server 400 (S513). The common standby system server 400, upon receiving the additional data, distinguishes the transmitting source through the IP address (S514), and adds the data to data held by the corresponding server (S515). The common standby system server 400 transmits, to the operation system server 30, a notice of completion of data addition (S517).

With reference to FIG. 4 and assuming that the main OS of the common standby system server is OS (A), the sequence of system switchover processing between the operation system servers of OS (A) and the common standby system serve is explained. In FIG. 4, it is assumed that OS (A) is registered as the main OS of the common standby system server 400 in the OS switching control unit 411.

The switching control unit 33-1 of the operation system server 30-A detects a switchover moment triggered by the system switchover directions from personnel in charge of failure recovery and maintenance, etc. (S35). The switching control unit 33-1 performs the application service halt processing (S37), and deletes the service IP address (S39). Herein, the service IP address is an IP address (a floating IP address) to be shown to the client, and differs from the IP address for communication with the common standby system server. In this state, the switching control unit 33-1 enters in a standby state. The switching control unit 33-1 transmits a notice of system switchover to the common standby system server 400 (S43). The virtual control unit 410 of the common standby system server 400, upon receiving the notice of system switchover, determines, through the source IP address, a server which has transmitted the notice of system switchover (S45). Since the main OS is OS (A), the virtual control unit 410 transmits the notice of system switchover as it is to the switching control unit 33-3 included in the same server as the OS which has transmitted the notice of system switchover (S47).

The switching control unit 33-3, upon receiving the notice of system switchover, assigns the service IP address to the application 35-2 (S49), and executes the application service start processing (S51). In this state, the common standby system server 400 enters in an operation state. The switching control unit 33-3 transmits, to the virtual control unit 410, a notice of start of operation, which indicates that the common standby system server 400 has entered in the operation state (S55). The virtual control unit 410, upon receiving the notice of start of operation, transmits the notice of start of operation to the switching control unit 33-1 of the operation system server 30-A in the standby state (S57).

When the client 10 accesses the server client system after the sequence shown in FIG. 4 is completed, the client 10 will be coupled to the common standby system server 400 unconsciously, because the service IP address is taken over to the common standby system server 400. Since the common standby system server 400 stores the backup of the operation system server 30, the common standby system server 400 can continue the service to the client 10.

With reference to FIG. 5 and on the assumption that the main OS of the common standby system server is OS (B), the sequence of system switchover processing between the operation system servers of OS (A) and the common standby system serve is explained. It is assumed here that OS (B) is registered in the OS switching control unit 411 as the main OS of common standby system server 400.

The switching control unit 33-1 of the operation system server 30-A detects a switchover moment triggered by the system switchover directions from personnel in charge of failure recovery and maintenance, etc. (S85). The switching control unit 33-1 performs the application service halt processing (S87), and deletes the service IP address (S89). In this state, the switching control unit 33-1 enters in a standby state. The switching control unit 33-1 transmits a notice of system switchover to the common standby system server 400 (S93). The virtual control unit 410 of the common standby system server 400, upon receiving the notice of system switchover, determines a server which has transmitted the notice of system switchover from the source IP address (S95). Since the main OS is OS (B), the virtual control unit 410 switches the main OS to OS (A) (S97). The virtual control unit 410 transmits a notice of system switchover to the switching control unit 33-3 included in the same server as the OS which has transmitted the notice of system switchover (S99).

The switching control unit 33-3, upon receiving the notice of system switchover, assigns the service IP address to the application 35-2 (S101), and executes the application service start processing (S103). In this state, the common standby system server 400 enters in an operation state. The switching control unit 33-3 transmits a notice of start of operation to the virtual control unit 410 (S107). The virtual control unit 410, upon receiving the notice of start of operation, transmits the notice of start of operation to the switching control unit 33-1 of the operation system server 30-A in the standby state (S109).

With reference to FIG. 6, explanation is given to the flow of process which the virtual control unit 410 of the common standby system server 400 performs after receiving the notice of system switchover. In FIG. 6, the virtual control unit 410, upon receiving the notice of system switchover, determines the server which has transmitted the notice of system switchover (S203). The virtual control unit 410 determines whether OS of the determined server is operating as the main OS in the common standby system server 400 (S205). If the determination is YES, the virtual control unit 410 transfers the notice of system switchover to the switching control unit 33-3 (S209). The virtual control unit 410 determines whether the notice of start of operation is received (S211). If the determination is YES, the virtual control unit 410 ends the processing. If the determination is NO, the virtual control unit 410 waits for the reception of the notice of start of operation. If the determination at Step 205 is NO, the main OS is switched to OS (A) (S207), and the flow proceeds to Step 209.

According to the present embodiment, the following effects can be enjoyed. First, in a case where a redundant configuration is established in the system in which plural OSs coexist, it is not necessary to provide a standby server for every OS, by using the common standby system server provided with the virtual control unit according to the present embodiment; thereby, it is possible to reduce physical resources.

Since the number of servers which becomes a candidate for maintenance can be reduced, it is possible to reduce costs consumed in maintenance and operation, such as personnel expenses and heat and light expenses. Furthermore, by providing in the virtual control unit of the common standby system server the resource management unit which manages the resources to be assigned to each OS, it is possible to set the priority to the operation system server which employs plural OSs coexisting in the system. This allows shortening of system switchover time for the highly-prioritized operation system server for example, leading to higher reliability of the system.

Since the virtual control unit which performs switchover control of each OS can absorb the fact that the common standby system server accommodates plural OSs, the switching control unit which performs redundant switching control in the operation system server and the common standby system server does not need to recognize the fact that the standby server is the common standby system server which employs the virtual control unit. Therefore, the shift from the existing system to the system mentioned above is easy.

The embodiment mentioned above explained a case of one operation system plus one standby system. However, the present invention is not limited to the case and may be applied to a redundant configuration system of n-set operation systems plus one standby system. The latter case is explained with reference to FIG. 7.

In FIG. 7, a server client system 100A includes (n+m)-set operation system servers 30, a common standby system server 400, and a client's computer (hereinafter called a client) 10, all coupled to a switching hub 20.

The operation system servers 30-A1 to 30-An are general-purpose servers which perform service provision using OS (A) 31. The operation system servers 30-B1 to 30-Bm are general-purpose servers which perform service provision using OS (B) 32. The common standby system server 400 operates as a standby server for the operation system server 30. The operation of the operation system server 30 and the common standby system server 400 is the same as described above.

According to the present embodiment, even in the system which includes plural kinds of OS, a redundant configuration system can be established by one set of a standby server, by employing the virtualization-technology-based standby server (information-processing equipment).

What is claim is:

1. An information-processing system comprising:
   first information-processing equipment operable to execute a first operating system and a first application to run on the first operating system;
   second information-processing equipment operable to execute a second operating system and a second application to run on the second operating system; and
   third information-processing equipment including an operating system switching control unit and operable to execute the first operating system, the first application, the second operating system, and the second application,
   wherein when said first information-processing equipment accepts operation to the first application of the first information-processing equipment, the first information-processing equipment reflects the operation to the first application of the third information-processing equipment,
   wherein when said second information-processing equipment accepts operation to the second application of the second information-processing equipment, the second information-processing equipment reflects the operation to the second application of the third information-processing equipment,
   wherein when a notice of system switchover is received, said operating system switching control unit specifies a service IP address of an operating system and an application of a switchover destination from a source IP address, and
   wherein when the operating system of the switchover destination is different from a main operating system of the third information-processing equipment, said operating system switching control unit switches over the main operating system of the third information-processing equipment to the operating system of the switchover destination, sets the specified service IP address of the operating system to the third information-processing equipment, and starts to provide service of the specified application of the switchover destination.

2. The information-processing system according to claim 1, further comprising one of a plurality of the first information-processing equipment and a plurality of the second information-processing equipment.

3. The information-processing system according to claim 1, said third information-processing equipment further including a resource management unit for managing assignment of the resource to each of the first operating system and the second operating system,
   wherein said resource management unit sets priorities to each of the first operating system and the second operating system according to priority information of operating systems specified at time of startup.

4. Information-processing equipment comprising an operating system switching control unit and operable to execute a first operating system, a first application to run on the first operating system, a second operating system, and a second application to run on the second operating system,
   wherein when a notice of system switchover is received, the operating system switching control unit specifies a service IP address of an operating system and an application of a switchover destination from a source IP address,
   wherein when the operating system of the switchover destination is different from a main operating system of the information-processing equipment, said operating system switching control unit switches over the main operating system of the information-processing equipment to the operating system of the switchover destination, sets the specified service IP address of the operating system to the information-processing equipment, and starts to provide service of the specified application of the switchover destination.

5. The information-processing equipment according to claim 4, wherein said operating system switching control unit sends a notice of start of operation to the sending source of the notice of system switchover when the service of the specified application is started.

6. The information-processing equipment according to claim 4, further comprising a resource management unit for managing assignment of the resource to each of the first operating system and the second operating system,
   wherein said resource management unit sets priorities to each of the first operating system and the second operating system.

* * * * *